United States Patent Office 2,876,165
Patented Mar. 3, 1959

2,876,165

DUSTING POWDER INCLUDING SALTS OF CARBOXYMETHYL DEXTRAN

Leo J. Novak, Dayton, Ohio, assignor to The Commonwealth Engineering Company of Ohio, Dayton, Ohio, a corporation of Ohio No Drawing. Application August 3, 1954
Serial No. 447,649

14 Claims. (Cl. 167—92)

This invention relates to a new and improved dusting powder. More particularly, it relates to a free-flowing, highly mobile dusting powder.

Powdered starches have been used for many years as dusting powders and have the advantage that they do not present a health hazard. However, starches have certain drawbacks for use as dusting powders. While the starch is hygroscopic, the moisture pick-up capacity is comparatively low. Even under normal humidity conditions, when the starch powders are in equilibrium with the moisture of the air, and the moisture absorption is 12% to 18% by weight, the powders are no longer free-flowing but tend to agglomerate and do not readily disperse into the individual particles or granules when dusted. For this reason, it has been common practice to redry the starch powders to about 5% moisture content for dusting purposes. This requires storage of the powders under special conditions such that the powder, after the redrying, is not exposed to air of normal humidity content and, furthermore, may be exposed to air for only a short period of time as it is used. The inability of the starch powder to absorb substantial amounts of moisture without clumping or caking also reduces the usefulness of the powder as a drying aid for moist or weeping body surfaces since caking of the powder on the body is objectionable. To be satisfactory for use on the body, a dusting powder should be mobile prior to use and capable of absorbing appreciable amounts of moisture from the surface of the body without caking.

One object of this invention is to provide new free-flowing dusting powders which do not lose the free-flowing property on exposure to normal or even high humidities and which are capable of absorbing appreciable amounts of moisture from the body without caking or gumming up thereon.

A further object is to provide a highly absorptive dusting powder for application to and drying of weeping body surfaces, such as those bearing serous exudate from raw sub-dermal surfaces after burns.

Another object is to provide a free-flowing dusting powder which is not only superior for use as a body powder, but which is also very suitable for the prevention of offsetting in the printing arts, and for other purposes.

These and other objects are accomplished by the present invention which provides dusting powders comprising finely divided metal salts of carboxymethyl dextran having an average particle size of 40 to 300 microns.

Metal salts which are useful for the present purposes include alkali metal salts such as the sodium, potassium and lithium salts, alkaline earth metal salts such as the calcium and strontium salts, and the ammonium salt.

The alkali metal salts may be obtained as initial products in the preparation of the carboxymethyl dextran as described in the pending application of L. J. Novak et al., Ser. No. 346,016, filed March 31, 1953, now abandoned. As described in said application, when dextran is reacted with an excess of a carboxymethylating agent such as sodium or potassium chloracetate in aqueous solution or dispersion containing an excess of an alkali metal hydroxide such as sodium or potassium hydroxide at 50° C. to 100° C. for ten minutes to two hours, under conditions such that the molar ratio of sodium or potassium chloracetate to dextran is between 2:1 and 12:1, the molar ratio of sodium or potassium hydroxide to dextran is between 5:1 and 15:1, and the molar ratio of water to dextran is between 70:1 and 120:1, the reaction product is a viscous mass comprising the alkali metal salt of a carboxymethyl dextran having a D. S. (degree of substitution or average number of carboxymethyl groups per anhydroglucopyranosidic unit) of less than 1.0, usually 0.2, up to 3.0, which salt can be precipitated by the addition of a water-miscible alcohol or ketone such as methanol, ethanol, propanol, isopropanol, t-butanol or acetone to the crude reaction mass.

To obtain a dusting powder in accordance with the invention, the alkali metal salt of the carboxymethyl dextran produced as described is ground or pulverized, if necessary, in any suitable device such as a micropulverizer or micronizer, to obtain a finely divided material having an average particle size of 40 to 300 microns, preferably 40 to 150 microns.

Alkaline earth metal salts of the ether, and the ammonium salt thereof, may be obtained by recovering the free ether from the alkali metal salt and then reacting it, in aqueous medium, with the appropriate base to obtain the desired alkaline earth metal or ammonium salt.

The free carboxymethyl dextran may be recovered from the alkali metal salt by mixing the latter with water, acidifying to pH 2.0, and precipitating the ether by means of a water-miscible alcohol or ketone. The pH of 2.0 is not critical and the ether may be precipitated at other acid pH values. However, the highest yields of the free ether have been obtained by precipitation thereof at pH 2.0.

The pH of the moist human skin is usually below 7.0, i. e., on the acid side and therefore, particularly when the dusting powder is to be applied to excessively perspiring skin surfaces, it is desirable to use a dusting powder that, in contact with the moisture of the skin, has a pH which is neutral or on the alkaline side, so that the acid skin surface is neutralized or made alkaline, and irritation of the skin is avoided. Dusting powders comprising a partial or complete salt of the ether generally have a pH at the neutral point or on the alkaline side when exposed to the moisture of the skin. The partial salts are usually obtained when the reaction of the carboxymethyl dextran and base is effected at pH 7.0, resulting in partial neutralization of the acidic ether, whereas the complete salts result when the reaction is carried out at alkaline pH of, say, 8 to 11, using an excess of the base, to insure complete neutralization of the ether.

The dextran carboxymethylated may be obtained by the action of microorganisms of the *Leuconostoc mesenteroides* or *L. dextranicum* types (or their enzymes) on sucrose. The procedure is to inoculate an aqueous sucrose-bearing nutrient medium containing appropriate inorganic salts and nitrogenous materials with a culture of the microorganism, or with the enzyme filtered from the culture, and incubate the mass until the dextran is produced in maximum yield, after which it is precipitated by the addition of a water-miscible aliphatic alcohol or ketone. Microorganisms which may be used include those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B1144, B–523; *Streptobacterium dextranicum* B–1254 and *Betabacterium vermiforme* B–1139, which synthesize a native dextran normally having a high molecular weight which may be in the millions and which may be water-soluble or substantially insoluble in water, depending on the microorganism used. The carboxymethyl ethers of the water-soluble or water-dispersible native dextrans such as that obtained using the microorganisms L. m. B–512, L. m. B–1146, and Streptobacterium dextranicum B–1254, and especially those ethers having an average D. S. with respect to carboxymethyl groups of 2.0 to 3.0, exhibit maximum hydrophilic property in the free ether form. However, these free ethers are acid and generally dusting powders consisting thereof are not desirable due to irritating effects on the skin, and are preferably converted to the partial or complete salt for application to the skin. The hydrophilic property of the ether is modified by conversion to the salt and, therefore, depends on whether the ether is partially or completely neutralized in the salt-forming reaction. The carboxymethyl ethers of the water-insoluble native dextrans, of which that obtained using the microorganisms L. m. B–523 or its enzyme is the prototype, especially those ethers containing an average of 2.0 to 3.0 carboxymethyl groups per anhydroglucopyranosidic unit, are less hydrophilic than the salts thereof and therefore can be rendered hydrophilic by conversion to the salt and to a degree depending on whether the ether is partially or completely neutralized with production of a partial or complete salt. It is thus possible to impart a controlled moisture pick-up and retention capacity to the ethers derived from the normally water-insoluble native dextrans by conversion of the ether to the salt.

The salts therefore provide a means for modifying and controlling the moisture pick-up and retention capacity of the ethers from the native dextrans making possible dusting powders the hydrophilic property and moisture pick-up and retention capacity of which vary over a wide range.

The ethers and salts need not be derived from the native, unhydrolyzed high molecular weight dextran. The native dextran may be partially hydrolyzed to lower molecular weight between the initial weight and 5000, prior to conversion to the ether and salt thereof. In general, the starting dextran may have a molecular weight of 5000 to $150 \times 10^6$ determined by light scattering measurements. This also affords a means of controlling the hydrophilic property of the dusting powder, since the hydrolyzed dextran is generally more hydrophilic than the native high molecular weight material, the susceptibility to moisture increasing with decrease in the molecular weight in the range given, and fewer carboxymethyl groups per AGU may be introduced into the dextran to obtain an ether which, after conversion to the salt, has a given moisture pick-up and retention capacity.

The base reacted with the carboxymethyl ether also influences the hydrophilic characteristic of the dusting powder. Thus, certain of the salts, such as the sodium and magnesium salts, are soluble in water and more highly hydrophilic or hygroscopic than other salts, whereas others of the salts, such as the calcium or strontium salts, are water-insoluble and relatively non-hydrophilic or non-hygroscopic. A dusting powder of predetermined hydrophilic characteristics and moisture pick-up and retention capacity can be obtained by selection of the starting dextran, whether water-soluble or water-insoluble, the molecular weight thereof, the D. S. with respect to carboxymethyl groups, the base used to neutralize or partially neutralize the ether, and whether the resulting salt is a partial or complete salt.

The presently preferred dusting powder consists essentially of a water-soluble salt of a carboxymethyl dextran derived from native, unhydrolyzed high molecular weight, water-soluble or water-insoluble dextran and containing an average of 2.0 to 3.0 carboxymethyl groups per AGU, or a blend of such a water-soluble salt with a water-insoluble salt of the carboxymethyl dextran. The blends may comprise from 5% to 95% by weight of the water-soluble salt and, conversely, from 95% to 5% by weight of the water-insoluble salt, but preferably comprises from 25% to 75% of the water-soluble salt and from 75% to 25% of the water-insoluble salt. Dusting powders consisting of blends of 50% of the water-soluble salt and 50% of the water-insoluble salt are satisfactory for application to moist or weeping skin areas.

As an example of a particularly suitable blend may be mentioned a blend of from 25% to 75% of the water-soluble magnesium salt of the carboxymethyl ether of native, unhydrolyzed high molecular weight L. m. B–512 dextran obtained by neutralization of the ether at pH 7.0, with 75% to 25% of the water-insoluble calcium salt of the carboxymethyl ether of native, unhydrolyzed high molecular weight L. m. B–512 dextran obtained by neutralization of the ether at pH 7.0. The water-insoluble non-hygroscopic calcium salt modifies the hydrophilic property of the water-soluble hygroscopic magnesium salt to a degree depending on the proportion thereof present in the blend. By varying the relative proportions of the salts, dusting powders having varying moisture pick-up and retention capacities are provided. Other water-soluble and water-insoluble salts of ethers derived from other dextrans and containing an average of 0.2 to 3.0 carboxymethyl groups per anhydroglucopyranosidic unit may be blended to obtain a fine dusting powder of modified and controlled hydrophilic property. Also, while the acidic free ethers are generally not suitable as such for application to the skin because of the irritating effects, the ethers may be blended with partially or completely neutralized ethers to obtain modified dusting powder having an average particle size of 40 to 300 microns.

The following examples are given to illustrate specific embodiments of the invention, it being understood that these examples are not intended to be limitative.

*Example I*

About 32.4 gms. of native unhydrolyzed L. m. B–512 dextran are dissolved in 125 mls. of water. The solution is added to a solution of 163 gms. of sodium chloracetate in 125 mls. of water. To this solution there is added, slowly, and in small portions, 64 gms. of sodium hydroxide. The temperature increased rapidly to 100° C. during the addition. The mass is held at the elevated temperature for thirty minutes, cooled rapidly, and poured into 500 mls. of methanol with vigorous agitation.. The precipitate is filtered off, redissolved in a minimum amount of hot (80° C.) water and again precipitated The precipitate is filtered, washed with methanol and dried at 50 mm. and 70° C. The product, sodium carboxymethyl dextran, has a D. S. of 2.8 and is obtained in 94 yield. It is reduced to a powder having an average particle size of 80 microns and used as a dusting powder which has the capacity to absorb up to 50% by weight of moisture from the skin without gumming up.

*Example II*

The sodium carboxymethyl dextran of Example I is dissolved in a minimum of water at 50° C. The solution is acidified to pH 2.0 with concentrated hydrochloric acid and the acidified solution is poured into 500 mls. of methanol with vigorous agitation. The precipitated solid is filtered off, dissolved and reprecipitated, filtered, washed with methanol and dried at 50 mm. and 70° C. The yield of the free ether is 97. It has the same D. S. as the salt. The ether is reacted in aqueous medium to pH 7.0 with magnesium hydroxide, to obtain the magnesium salt. The salt is precipitated with alcohol as for the free ether and vacuum dried at 70° C. The water-soluble salt is ground in a micronizer to obtain particles having an average size of 100 microns and the finely divided salt is used as a dusting powder for moist or sweeping skin surfaces.

*Example III*

Corboxymethyl dextran as in Example II but derived from NRRL B–523 native unhydrolyzed dextran is converted to the water-insoluble calcium salt which is ground in a micronizer to obtain a powder the average particle size of which is 100 microns. This salt may be used as a dusting powder where high moisture absorptiveness is not required or it may be, and preferably is, blended with one or more water-soluble salts which are hydrophilic, to modify the properties of the latter and of the dusting powder comprising the blend.

The powdered carboxymethyl dextrans and the salts thereof remain in free-flowing, mobile condition for indefinite periods of time when kept in closed containers.

The powdered carboxymethyl dextran of the stated average particle size is adapted to uses other than as a body dusting powder. It may be used to prevent off-set in printing processes, for example, in those processes in which a powdered material is fed from a hopper by means of a roll and discharges adjacent an electronic tube, and in other processes in which the powder is discharged by other means such as air blast spraying or sifting methods.

Although the dusting powder may consist of the carboxymethyl salts or mixtures of the salts with the free ethers, an important embodiment of the invention contemplates the use of the ethers and the salts, particularly the latter, in combination with other dusting powders such as talc, mica, di-calcium phosphate, magnesium carbonate, the various forms of starch, and the like. More particularly, the invention contemplates modification and improvement in the mobility and capacity to absorb substantial amounts of moisture without agglomeration of starch powders and to accomplish this the powdered water-soluble or water-insoluble carboxymethyl dextran salts are blended in amounts of 5% to 65% by weight in any suitable mixing device with finely divided starch. As an example, when 50% by weight of the powdered sodium or magnesium salt of the carboxymethyl ether of native, unhydrolyzed high molecular weight $L. m.$ B–512 dextran containing an average of 2.0 to 3.0 carboxymethyl groups per AGU is blended with 50 of starch powder having an average micron size of 40 to 300 microns, to obtain an intimate mixture of the two, the resulting dusting powder has improved flow characteristics and mobility, and when applied to a moist or weeping body surface, has the capacity to absorb more moisture, up to 35% to 50% of its weight, without agglomerating or caking than a dusting powder consisting essentially of the starch, and has improved shelf life in that it does not aggregate into lumps if exposed to ordinary atmospheric conditions. Blends of the ether salts with talc and other materials commonly used for body dusting purposes are also improved. The salts of any of the carboxymethyl dextrans of D. S. between 0.2 and 3.0 may be blended with the starch, talc or the like but at present the preferred salt for the blend is that resulting from partial or complete neutralization of the highly substituted (D. S. 2.0 to 3.0) ethers of native unhydrolyzed high molecular weight dextrans like $L. m.$ B–512 or $L. m.$ B–523 dextran.

Alkali metal and alkaline earth metal salts other than those specifically mentioned or exemplified are contemplated and are prepared in the usual way, by reacting the ether with an amount of the appropriate base sufficient to partially or completely neutralize the acidic ether, an excess of the base over the calculated amount being used, preferably, when complete neutralization is desired.

The powdered carboxymethyl dextran ethers and salts of the stated average particle size are adapted to uses other than as body dusting powders. The powders may be used to prevent off-set in printing processes, for example in such processes in which a powdered material is fed from a hopper by means of a roll and discharges adjacent an electronic tube, and in other processes in which the powder is discharged by other means such as air blast spraying or sifting methods.

The powdered carboxymethyl dextran salts may be used, also, as a base or carrier for various materials including fungicides, insecticides and medicaments.

Since some changes and variations may be made in details in the practice of the invention without departing from the spirit and scope of the disclosure and invention, it is to be understood that it is not intended to limit the invention except as defined in the appended claims.

What is claimed is:

1. A free-flowing, mobile, dusting powder consisting of particles of a substance selected from the group consisting of alkali metal salts of carboxymethyl dextran, alkaline earth metal salts of carboxymethyl dextran and the ammonium salt of carboxymethyl dextran and mixtures thereof, the particles having an average size of 40 to 300 microns.

2. A free-flowing, mobile, moisture absorptive dusting powder consisting of particles of an alkali metal salt of carboxymethyl dextran, the particles having an average size of 40 to 300 microns.

3. A free-flowing, mobile, moisture absorptive dusting powder consisting of particles of an alkaline earth metal salt of carboxymethyl dextran, the particles having an average size of 40 to 300 microns.

4. A free-flowing, mobile, moisture absorptive dusting powder consisting of particles of a sodium salt of carboxymethyl dextran, the particles having an average size of 40 to 300 microns.

5. A free-flowing, mobile, moisture absorptive dusting powder consisting of particles of a magnesium salt of carboxymethyl dextran, the particles having an average size of 40 to 300 microns.

6. A free-flowing, mobile, moisture absorptive dusting powder consisting of particles of a calcium salt of carboxymethyl dextran, the particles having an average size of 40 to 300 microns.

7. A free-flowing, highly mobile, moisture absorptive dusting powder consisting of a blend of 5% to 95% by weight of particles of a magnesium salt of carboxymethyl dextran with 95% to 5% of particles of a calcium salt of carboxymethyl dextran, the particles having an average size of 40 to 300 microns.

8. A free-flowing, highly mobile, moisture absorptive dusting powder consisting of a blend of finely divided starch and particles of a magnesium salt of carboxymethyl dextran, the particles having an average size of 40 to 300 microns.

9. A free-flowing, highly mobile, moisture absorptive dusting powder consisting of a blend of about 50% by weight of a particulate magnesium salt of carboxymethyl dextran derived from native, unhydrolyzed, high molecular weight, microbiologically produced dextran and containing an average of 2.0 to 3.0 carboxymethyl groups per anhydroglucopyranosidic unit, with about 50% of a particulate calcium salt of carboxymethyl dextran, the particles having an average size of 40 to 300 microns.

10. A free-flowing, highly mobile, moisture absorptive dusting powder consisting of a blend of finely divided starch and a substance selected from the group consisting of alkali metal and alkaline earth metal salts of carboxymethyl dextran, and the ammonium salt of carboxymethyl dextran and mixtures thereof, the particles having an average size of 40 to 300 microns.

11. A free-flowing, highly mobile, moisture absorptive dusting powder consisting of a blend of finely divided starch and a particulate magnesium salt of carboxymethyl dextran derived from native, unhydrolyzed, high molecular weight, microbiologically produced dextran and containing an average of 2.0 to 3.0 carboxymethyl groups per anhydroglucopyranosidic unit, the particles having an average size of 40 to 300 microns.

12. A free-flowing, highly mobile, moisture absorptive dusting powder as set forth in claim 10, wherein said salts of carboxymethyl dextran are derived from native, unhydrolyzed, high molecular weight, microbiologically produced dextran containing an average of 2.0 to 3.0 carboxymethyl groups per anhydroglucopyranosidic unit.

13. A free-flowing, highly mobile, moisture absorptive dusting powder consisting of a blend of particulates of different size and selected from the group consisting of alkali metal and alkaline earth metal salts of carboxymethyl dextran and the ammonium salt of carboxymethyl dextran and mixtures thereof.

14. A free-flowing, highly mobile, moisture absorptive dusting powder as set forth in claim 13, wherein said salts of carboxymethyl dextran are derived from native, unhydrolyzed, high molecular weight, microbiologically produced dextran containing an average of 2.0 to 3.0 carboxymethyl groups per anhydroglucopyranosidic unit.

References Cited in the file of this patent

UNITED STATES PATENTS

| | | |
|---|---|---|
| 2,373,933 | Weeks | Apr. 17, 1945 |
| 2,609,368 | Gaver | Sept. 2, 1952 |
| 2,749,277 | Toulmin | June 5, 1956 |

OTHER REFERENCES

Walton: Manufg. Chemist, vol. 24, August 1953, p. 333.

Hollabaugh: Industrial and Eng. Chem., vol. 37, October 1945, p. 945.